United States Patent
Matsuoka

(10) Patent No.: US 11,285,798 B2
(45) Date of Patent: Mar. 29, 2022

(54) DRIVE SYSTEM

(71) Applicant: EXEDY Corporation, Neyagawa (JP)

(72) Inventor: Yoshihiro Matsuoka, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 17/060,411

(22) Filed: Oct. 1, 2020

(65) Prior Publication Data

US 2021/0129653 A1  May 6, 2021

(30) Foreign Application Priority Data

Nov. 1, 2019 (JP) .............................. JP2019-199681

(51) Int. Cl.
*B60K 6/50* (2007.10)
*B60K 6/24* (2007.10)
*B60K 6/26* (2007.10)
*B60K 6/40* (2007.10)
*B60K 6/383* (2007.10)

(52) U.S. Cl.
CPC ................ *B60K 6/383* (2013.01); *B60K 6/24* (2013.01); *B60K 6/26* (2013.01); *B60K 6/50* (2013.01)

(58) Field of Classification Search
CPC . B60K 6/383; B60K 6/24; B60K 6/26; B60K 6/50
See application file for complete search history.

(56) References Cited

U.S. PATENT DOCUMENTS

| 7,276,008 B2 * | 10/2007 | Yasui ..................... B60K 6/387 475/5 |
| 2005/0150734 A1 * | 7/2005 | Breier ...................... B60K 6/26 192/3.21 |
| 2015/0065294 A1 * | 3/2015 | Borntrager .............. B60T 1/087 477/4 |
| 2020/0325970 A1 * | 10/2020 | Lahr ......................... B60K 6/48 |
| 2021/0070161 A1 * | 3/2021 | Kawahara ............... F16H 45/02 |

FOREIGN PATENT DOCUMENTS

| JP | 2765840 B2 * | 6/1998 | ............. B60K 23/02 |
| JP | 2012-100454 A | 5/2012 | |
| KR | 101582604 B1 * | 1/2016 | ............... B60K 6/50 |

OTHER PUBLICATIONS

KR 101582604 machine translation filed Jul. 16, 2021 (Year: 2021).*
JP 2765840 machine translation filed Jul. 15, 2021 (Year: 2021).*

* cited by examiner

*Primary Examiner* — Tisha D Lewis
(74) *Attorney, Agent, or Firm* — United IP Counselors, LLC

(57) ABSTRACT

A drive system includes a motor, an engine, a torque converter and an output shaft member. The torque converter is a device to which a torque outputted from the motor is inputted. The output shaft member outputs the torque inputted thereto from the torque converter or a torque inputted thereto from the engine. The engine outputs the torque to the output shaft member without through the torque converter.

9 Claims, 4 Drawing Sheets

DRIVE SYSTEM

CROSS-REFERENCE TO RELATED APPLICATIONS

This application claims priority to Japanese Patent Application No. 2019-199681, filed Nov. 1, 2019. The contents of that application are incorporated by reference herein in their entirety.

TECHNICAL FIELD

The present invention relates to a drive system.

BACKGROUND ART

As a conventional art, it has been known that hybrid electric vehicles (HEV) travel using both an engine and an electric motor as drive sources. There has been proposed a type of electric vehicle in which a torque converter is installed in order to amplify torques outputted from the engine and the motor (see Japanese Laid-open Patent Application Publication No. 2012-100454).

BRIEF SUMMARY

When the engine and the motor are both connected to the torque converter in this type of electric vehicle, even in traveling by using only the engine, the motor and the torque converter are rotated in conjunction with rotation of the engine. This results in drive loss. In view of this, it is an object of the present invention to provide a drive system capable of reducing drive loss.

A drive system according to an aspect of the present invention includes a motor, an engine, a torque converter and an output shaft member. The torque converter is a device to which a torque outputted from the motor is inputted. The output shaft member outputs either the torque inputted thereto from the torque converter or a torque inputted thereto from the engine. The engine outputs the torque to the output shaft member without through the torque converter.

According to this configuration, the torque outputted from the motor is outputted through the torque converter. Hence, the torque can be enhanced in magnitude. Because of this, starting movement of a vehicle is enabled by using only the motor as a drive source. Besides, the engine outputs the torque without through the torque converter. Hence, when the vehicle travels by using only the engine, the torque converter and the motor are not rotated in conjunction with rotation of the engine. As a result, drive loss can be reduced.

Preferably, the torque converter includes a cover, an impeller and a turbine. The cover is a component to which the torque is inputted from the motor. The impeller is integrally rotated with the cover. The turbine is opposed to the impeller.

Preferably, the torque converter includes an impeller and a turbine. The impeller is a component to which the torque is directly inputted from the motor. The turbine is opposed to the impeller.

Preferably, connection is made between the engine and the output shaft member by a clutch capable of transmitting or blocking the torque.

According to this configuration, traveling of the vehicle is enabled by using only the motor while the engine is stopped. Furthermore, regardless of the rotational speed of the engine, the torque outputted from the engine can be inputted to the output shaft member at arbitrary timing.

Preferably, the clutch is a one-way clutch.

According to this configuration, the torque outputted from the engine is inputted to the output shaft member only when the rotational speed of the engine becomes greater than that of the output shaft member. In other words, the torque outputted from the engine is not inputted to the output shaft member unless the rotational speed of the engine is sufficient. Therefore, only the motor can be used in starting movement of the vehicle, whereas only the engine can be used during traveling of the vehicle. As a result, the torque can be efficiently used.

Preferably, the engine and the output shaft member are connected through a first elastic member.

According to this configuration, vibration transferred from the engine can be absorbed by the first elastic member.

Preferably, the turbine and the output shaft member are connected through a second elastic member.

In a well-known art, the torque outputted from the engine is transmitted to the output shaft member through the torque converter. Because of this, vibration transferred from the engine is absorbed by the torque converter. On the other hand, in a preferred embodiment of the present invention, the torque outputted from the engine is transmitted without through the torque converter. However, when the turbine and the output shaft member are connected through the second elastic member, the turbine can be used as a dynamic vibration absorber (hereinafter referred to as a turbine dynamic damper as well). In other words, vibration transferred from the engine can be absorbed by the turbine dynamic damper.

Preferably, connection is made between the cover and the turbine by a second clutch.

According to this configuration, direct coupling is enabled between a rotational shaft of the engine and that of the transmission. Hence, fuel consumption and torque performance can be enhanced.

Overall, according to the present invention, drive loss can be reduced.

DETAILED DESCRIPTION

Figure 1:
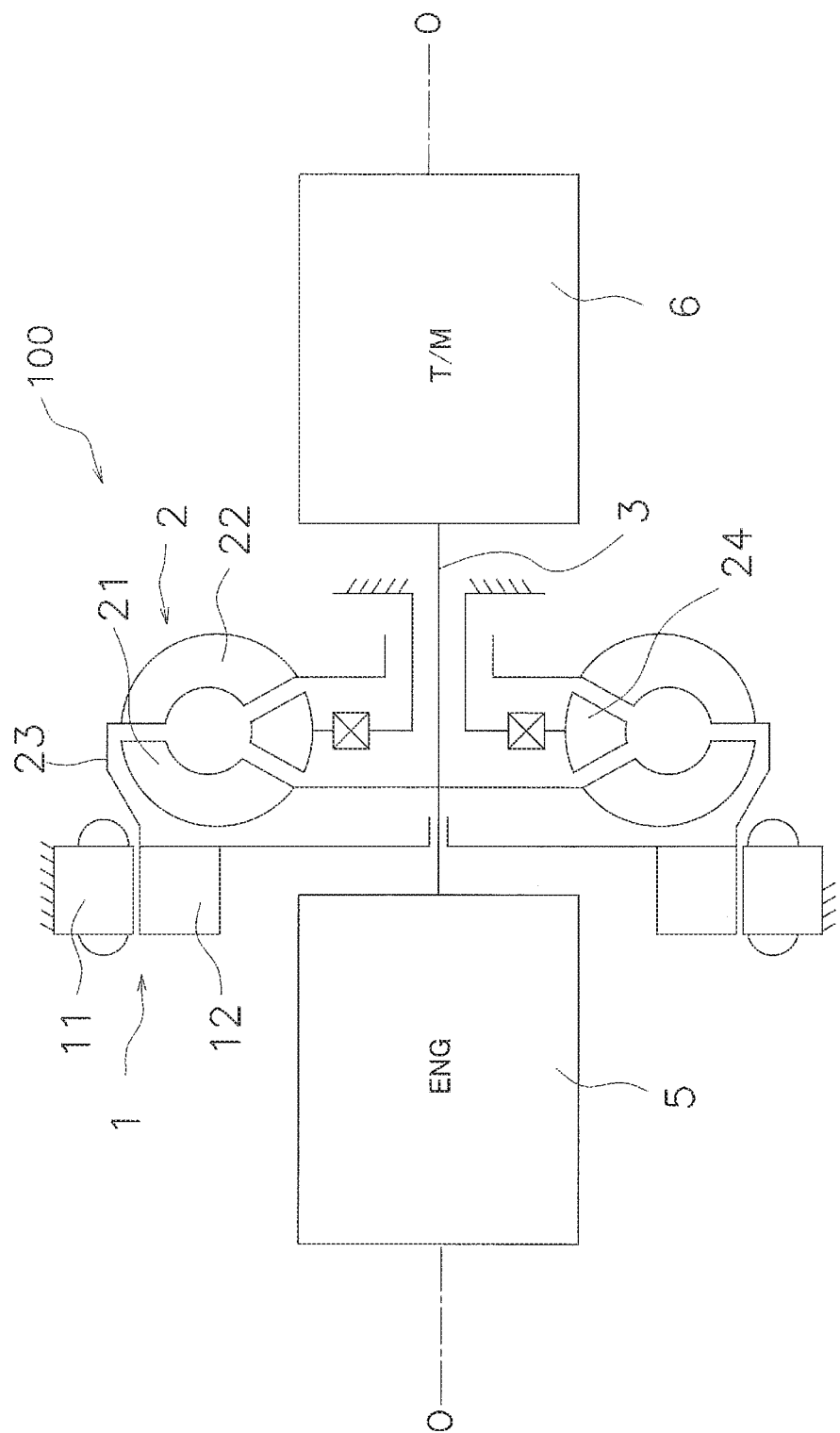
FIG. 1 is a schematic diagram of a drive system.

A drive system according to the present preferred embodiment will be hereinafter explained with reference to drawings. FIG. 1 is a schematic diagram of a drive system 100 according to the present preferred embodiment. It should be noted that in the following explanation, the term "axial direction" refers to an extending direction of a rotational axis O of a motor 1 and a torque converter 2. On the other hand, the term "circumferential direction" refers to a circumferential direction of an imaginary circle about the rotational axis O, whereas the term "radial direction" refers to a radial direction of the imaginary circle about the rotational axis O.

[Drive System 100]

As shown in FIG. 1, the drive system 100 includes the motor 1, an engine 5, the torque converter 2 and an output shaft member 3. The drive system 100 is installed in, for instance, a hybrid electric vehicle (HEV).

<Motor 1>

The motor 1 includes a motor stator 11 and a motor rotor 12. In the present preferred embodiment, the motor 1 is a so-called inner rotor motor. The motor 1 further includes a motor casing (not shown in the drawings). The motor casing is fixed to a vehicle body frame or so forth and is non-rotatable.

The motor stator 11 is fixed to the inner peripheral surface of the motor casing. The motor stator 11 is non-rotatable. The motor rotor 12 is rotated about the rotational axis O. The motor rotor 12 is disposed radially inside the motor stator 11.

<Engine 5>

The engine 5 is a prime mover outputting a torque generated by combustion of fuel. For example, a spark ignition engine (e.g., gasoline engine), a compression ignition engine (e.g., diesel engine) or so forth is usable as the engine 5.

The engine 5 is directly connected to the output shaft member 3 (to be described). In other words, the engine 5 outputs the torque to the output shaft member 3 without through the torque converter 2 (to be described).

The condition "without through the torque converter 2" herein means non-use of a function of the torque converter 2. Therefore, the condition "without through the torque converter 2" is satisfied even when the engine 5 rotates, for instance, only a turbine 21 (to be described) among components of the torque converter 2.

<Torque Converter 2>

The torque converter 2 is disposed at an interval from the motor 1 in the axial direction. The engine 5, the motor 1 and the torque converter 2 are axially aligned in this order.

The rotational axis O of the torque converter 2 is substantially matched with that of the motor 1. The torque converter 2 is a device to which a torque, outputted from the motor 1, is inputted. Then, the torque converter 2 amplifies the torque inputted thereto from the motor 1 and outputs the amplified torque to the output shaft member 3 (to be described).

As shown in FIG. 1, the torque converter 2 includes the turbine 21, an impeller 22, a cover 23 and a stator 24. Besides, the torque converter 2 may further include a second clutch device 25 (see FIG. 2).

The torque converter 2 is disposed such that the cover 23 faces the motor 1 (the left side in FIG. 1). The torque converter 2 is accommodated in a torque converter casing (not shown in the drawings). Hydraulic fluid is supplied to the interior of the torque converter 2. The hydraulic fluid is, for instance, hydraulic oil.

The cover 23 is a component to which the torque, outputted from the motor 1, is inputted. When the torque, outputted from the motor 1, is inputted to the cover 23, the cover 23 is rotated by the torque from the motor 1. The cover 23 is fixed to the motor rotor 12 of the motor 1. Because of this, the cover 23 is unitarily rotated with the motor rotor 12. The cover 23 is disposed to cover the turbine 21.

As shown in FIG. 1, the impeller 22 is unitarily rotated with the cover 23. The impeller 22 is fixed to the cover 23. The impeller 22 includes an impeller shell, a plurality of impeller blades, an impeller hub and a plurality of supply flow pathways, all of which are not shown in the drawings.

The impeller shell is fixed to the cover 23. The plural impeller blades are attached to the inner surface of the impeller shell.

The impeller hub is attached to the inner peripheral end of the impeller shell. The impeller hub may be provided together with the impeller shell as a single member, or alternatively, may be provided as a member separated from the impeller shell.

The turbine 21 is disposed in opposition to the impeller 22. Detailedly, the turbine 21 is axially opposed to the impeller 22. The turbine 21 is a component to which a torque is transmitted from the impeller 22 through the hydraulic fluid.

The turbine 21 includes a turbine shell, a plurality of turbine blades and a turbine hub, all of which are not shown in the drawings. The plural turbine blades are fixed to the inner surface of the turbine shell.

The turbine hub is fixed to the inner peripheral end of the turbine shell. For example, the turbine hub is fixed to the turbine shell by one or more rivets (not shown in the drawings). The turbine hub may be provided as a member separated from the turbine shell, or alternatively, may be provided together with the turbine shell as a single member.

The output shaft member 3 is attached to the turbine hub. Detailedly, the output shaft member 3 is spline-coupled to the turbine hub. The turbine hub is unitarily rotated with the output shaft member 3.

The stator 24 is configured to regulate the flow of the hydraulic oil returning from the turbine 21 to the impeller 22. The stator 24 is rotatable about the rotational axis O. The stator 24 is disposed axially between the impeller 22 and the turbine 21.

The stator 24 includes a stator carrier (not shown in the drawings) having a disc shape and a plurality of stator blades (not shown in the drawings) attached to the outer peripheral surface of the stator carrier.

The torque is transmitted from the impeller 22 to the turbine 21, while being amplified by the stator 24.

The second clutch device 25 is disposed in a space between the cover 23 and the turbine 21.

<Output Shaft Member 3>

As shown in FIG. 1, the output shaft member 3 outputs the torque, inputted thereto from the torque converter 2 or the engine 5, toward one or more drive wheels (not shown in the drawings). Detailedly, the output shaft member 3 outputs the torque, inputted thereto from the torque converter 2 or the engine 5, to the one or more drive wheels through a transmission 6. The output shaft member 3 is connected to the torque converter 2 and the engine 5. The output shaft member 3 extends from the torque converter 2 and the engine 5 toward the transmission 6.

In other words, the drive system 100 has two torque transmission paths. The drive system 100 transmits the torque in a sequential order of the motor 1, the torque converter 2 and the output shaft member 3 through a first torque transmission path. The drive system 100 transmits the torque in a sequential order of the engine 5 and the output shaft member 3 through a second torque transmission path.

[Modifications]

One preferred embodiment of the present invention has been explained above. However, the present invention is not limited to the above, and a variety of changes can be made without departing from the gist of the present invention.

Modification 1

Figure 3:
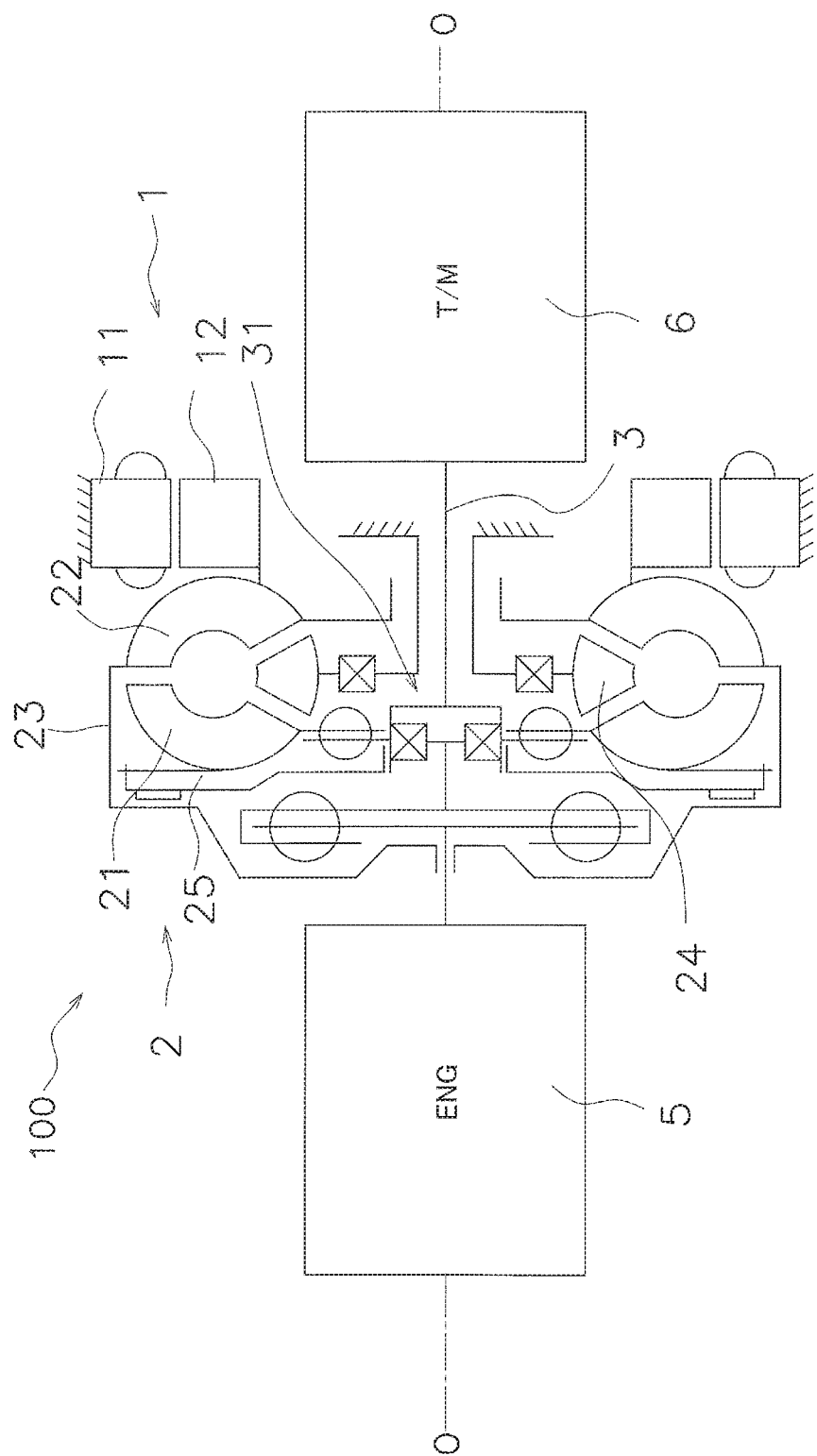
FIG. 3 is a schematic diagram of a drive system according to a modification different from the modification in FIG. 2.

In the aforementioned preferred embodiment, the torque outputted from the motor 1 is inputted to the cover 23. However, the configuration of torque transmission is not limited to this. As shown in FIG. 3, the torque, outputted from the motor 1, may be directly inputted to the impeller 22.

Modification 2

Figure 2:
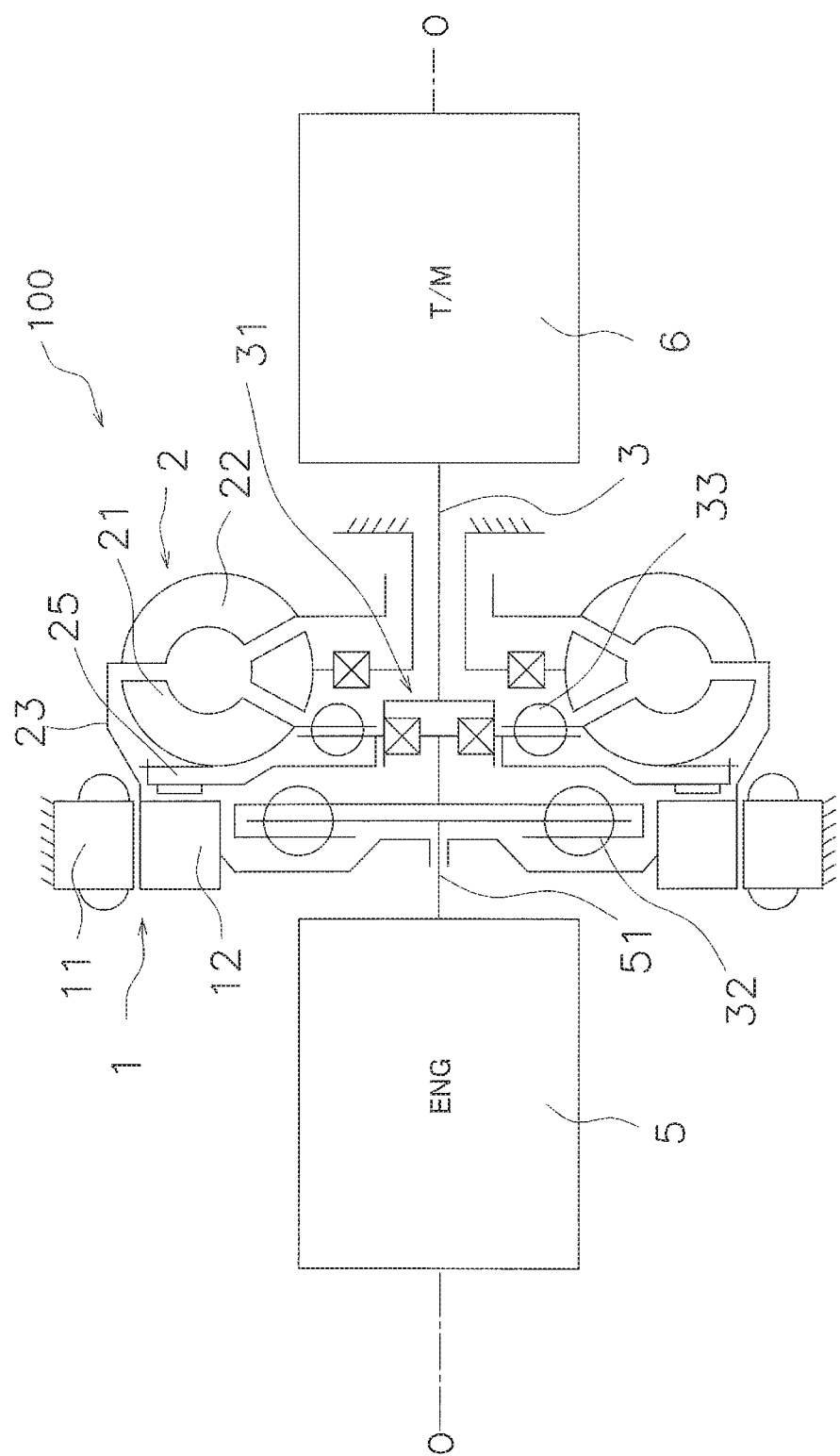
FIG. 2 is a schematic diagram of a drive system according to a modification.

As shown in FIG. 2, the output shaft member 3 may further include a first clutch device 31. The first clutch device 31 is disposed between the engine 5 and the transmission 6.

In this case, a crankshaft 51 of the engine 5 is connected at the distal end thereof to the first clutch device 31.

The first clutch device 31 is configured to transmit the torque, outputted from the engine 5, to the transmission 6 therethrough and block transmission of the torque. Detailedly, when the first clutch device 31 is engaged (in a clutch-on state), rotation of the crankshaft 51 of the engine 5 is transmitted to the output shaft member 3 through the first clutch device 31. Accordingly, the torque of the engine 5 is transmitted to the output shaft member 3. By contrast, when the first clutch device 31 is disengaged (in a clutch-off state), the rotation of the engine 5 is not transmitted to the output shaft member 3.

It should be noted that the first clutch device 31 may be of a mechanical type, or alternatively, may be of an electromagnetic type as long as the first clutch device 31 enables transmission and block of the torque from the engine 5 to the output shaft member 3. With the configuration of the first clutch device 31, when the clutch-off state is made, traveling of the vehicle is enabled by using only the motor 1 even if the engine 5 is stopped.

The first clutch device 31 is preferably a one-way clutch. The one-way clutch transmits a torque inputted thereto from the engine 5 to the output shaft member 3 only when the rotational speed of the engine 5 becomes greater than that of the output shaft member 3. In other words, even if the output shaft member 3, to which a torque is inputted from the motor 1 through the torque converter 2, is being rotated, the torque is not inputted to the engine 5 from the output shaft member 3 as long as the rotational speed of the output shaft member 3 is greater than that of the engine 5.

When the first clutch device 31 is a one-way clutch, the torque generated by the engine 5 is not transmitted to the output shaft member 3 in starting movement of the vehicle, because the rotational speed of the output shaft member 3 is greater than that of the engine 5. On the other hand, after starting movement of the vehicle, when the rotational speed of the engine 5 increases and becomes greater than that of the output shaft member 3, the torque generated by the engine 5 is transmitted to the output shaft member 3.

Modification 3

As shown in FIG. 2, the engine 5 and the output shaft member 3 may be connected through one or more first elastic members 32. The one or more first elastic members 32 elastically couple the engine 5 and the output shaft member 3 therethrough, while being disposed between the cover 23 and the second clutch device 25. The one or more first elastic members 32 are, for instance, one or more torsion springs each extending in the circumferential direction.

Modification 4

Figure 4:
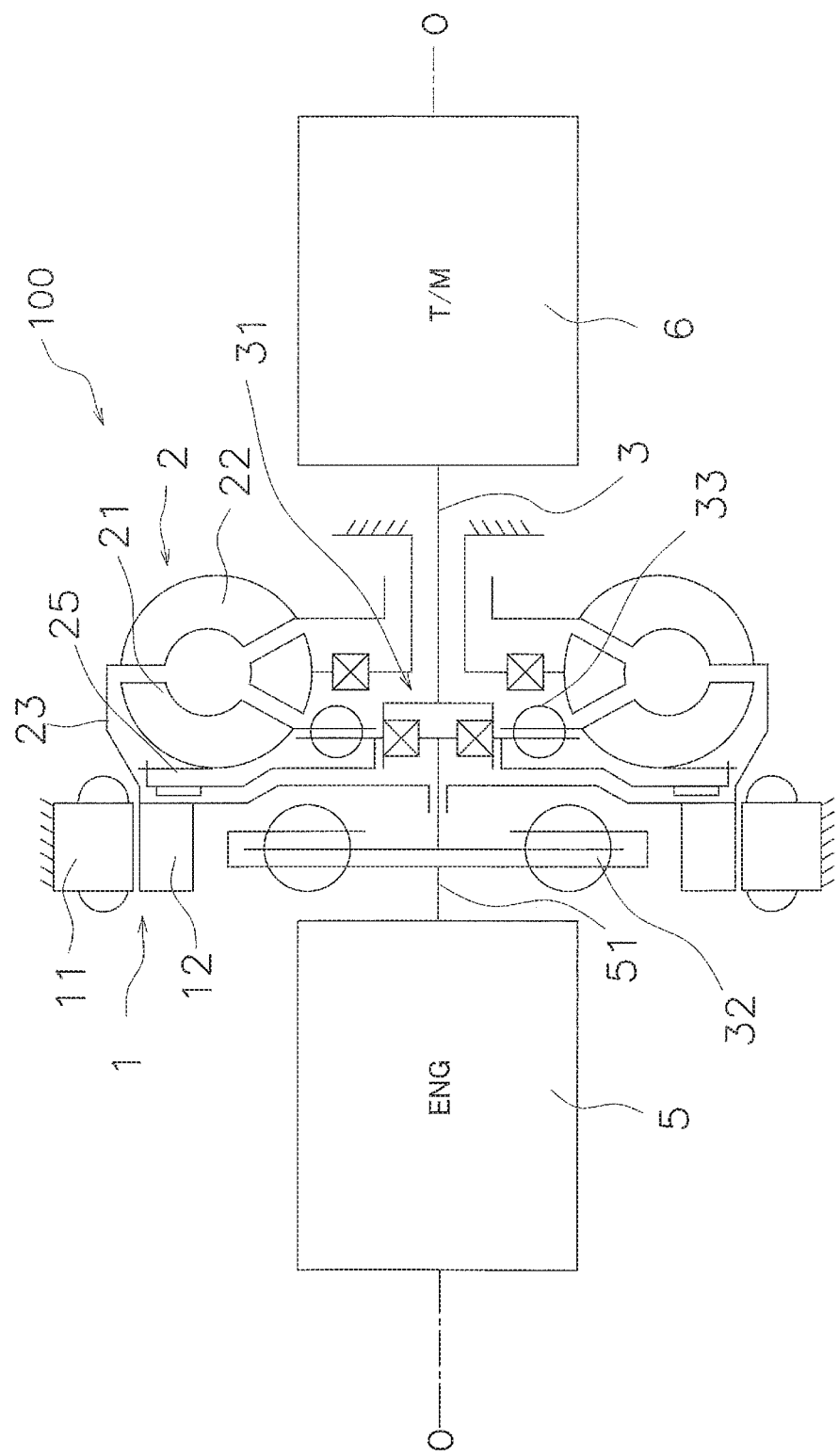
FIG. 4 is a schematic diagram of a drive system according to a modification different from the modifications in FIGS. 2 and 3.

As shown in FIG. 2, the turbine 21 and the output shaft member 3 may be connected through one or more second elastic members 33. The one or more second elastic members 33 elastically couple the turbine 21 and the output shaft member 3 therethrough. The one or more second elastic members 33 are, for instance, one or more torsion springs each extending in the circumferential direction. The one or more second elastic members 33 are each supported at the both circumferential end surfaces thereof by the turbine 21 and the output shaft member 3. Modification 5 [0059] In the aforementioned preferred embodiment, the one or more first elastic members 32 are accommodated inside the torque converter 2. However, the layout of the one or more first elastic members 32 is not limited to this. As shown in FIG. 4, the one or more first elastic members 32 may be disposed outside the torque converter 2.

<Actions>

The drive system 100 configured as described above transmits a torque in a sequential order of to the motor 1, the torque converter 2, the output shaft member 3 and the transmission 6 in starting movement of the vehicle. When the drive system 100 herein includes a one-way clutch, the engine 5 is enabled to be stopped. Because of this, mechanical friction loss of the engine 5 (i.e., engine friction loss) is reduced. Furthermore, the torque generated by the motor 1 can be reduced by the torque converter 2. Because of this, reduction in voltage of the motor 1 or compactness in size of the motor 1 is enabled. Yet furthermore, heat generated by the motor 1 can be also reduced.

Moreover, when traveling at a low speed, the vehicle basically travels by using only the motor 1. Depending on situations, the motor 1 and the torque converter 2 are used in combination, whereby the motor 1 can be used when exerting good motor efficiency. Furthermore, when the rotational speed of the output shaft member 3 becomes greater than an idling rotational speed of the engine 5 in a high load condition, the engine 5 is activated whereby both the motor 1 and the engine 5 can be also used for traveling of the vehicle. Yet furthermore, vibration herein produced by the engine 5 can be reduced by the one or more first elastic members 32.

Moreover, when traveling at an intermediate speed, the vehicle is enabled to travel by using both the motor 1 and the engine 5 such that each of the motor 1 and the engine 5 is used when exerting good efficiency. Slippage of the torque converter 2 can be herein reduced by engaging the second clutch device 25 on an as-needed basis. Furthermore, when the vehicle travels by mainly using the engine 5, the one or more second elastic members 33 and the inertia of the turbine 21 act as a dynamic vibration absorber. Yet furthermore, when the second clutch device 25 is engaged, the inertia of the cover 23 of the torque converter 2 and that of the motor rotor 12 can be also added to the inertia of the turbine 21.

Moreover, when traveling at a high speed, the vehicle is basically enabled to travel by using only the engine 5. The engine 5 herein outputs a torque without through the torque converter 2. Hence, when the vehicle travels by using only the engine 5, the torque converter 2 and the motor 1 are not rotated in conjunction with rotation of the engine 5. As a result, drive loss can be reduced. Furthermore, in the high load condition, the motor 1 can be activated for assisting the engine 5.

Moreover, when the vehicle decelerates, regenerative braking of the motor 1 is enabled by engaging the second clutch device 25. Furthermore, when regenerative braking of the motor 1 is disabled due to a fully changed state of a battery, braking of the torque converter 2 is enabled by disengaging the second clutch device 25 and by driving the motor 1 such that the impeller 22 is rotated in a reverse direction to the turbine 21.

REFERENCE SIGNS LIST

1 Motor
2 Torque converter
3 Output shaft member
5 Engine

25 Second clutch device (second clutch)
23 Cover
21 Turbine
22 Impeller
31 First clutch device (first clutch)
32 First elastic member
33 Second elastic member
100 Drive system

What is claimed is:

1. A drive system comprising:
a motor;
an engine;
a torque converter to which a torque outputted from the motor is inputted; and
an output shaft member configured to output either the torque inputted thereto from the torque converter or a torque inputted thereto from the engine, wherein
the drive system has a single path to transmit the torque from the engine, and
the engine is configured to output the torque to the output shaft member without through the torque converter in the single path.

2. The drive system according to claim 1, wherein the torque converter includes
a cover to which the torque is inputted from the motor,
an impeller integrally rotated with the cover, and
a turbine opposed to the impeller.

3. The drive system according to claim 1, wherein the torque converter includes
an impeller to which the torque is directly inputted from the motor, and
a turbine opposed to the impeller.

4. The drive system according to claim 1, wherein connection is made between the engine and the output shaft member by a clutch configured to transmit or block the torque.

5. The drive system according to claim 4, wherein the clutch is a one-way clutch.

6. The drive system according to claim 1, wherein the engine and the output shaft member are connected through a first elastic member.

7. The drive system according to claim 2, wherein the turbine and the output shaft member are connected through a second elastic member.

8. The drive system according to claim 3, wherein the turbine and the output shaft member are connected through a second elastic member.

9. The drive system according to claim 2, wherein connection is made between the cover and the turbine by a second clutch.

* * * * *